United States Patent
Wang et al.

(10) Patent No.: US 10,893,023 B2
(45) Date of Patent: Jan. 12, 2021

(54) PER-APPLICATION VPN IN CONTAINER BASED ENVIRONMENTS

(71) Applicant: VMware, Inc., Palo Alto, CA (US)

(72) Inventors: Nan Wang, Beijing (CN); Sam Zhao, Beijing (CN); Shengbo Teng, Beijing (CN); Wen Wang, Beijing (CN); Jingtao Zhang, Beijing (CN)

(73) Assignee: VMware, Inc., Palo Alto, CA (US)

( * ) Notice: Subject to any disclaimer, the term of this patent is extended or adjusted under 35 U.S.C. 154(b) by 364 days.

(21) Appl. No.: 15/870,025

(22) Filed: Jan. 12, 2018

(65) Prior Publication Data

US 2019/0222559 A1 Jul. 18, 2019

(51) Int. Cl.
*H04L 29/06* (2006.01)
*G06F 9/455* (2018.01)
*G06F 9/54* (2006.01)
*G06F 21/53* (2013.01)

(52) U.S. Cl.
CPC ...... *H04L 63/0272* (2013.01); *G06F 9/45558* (2013.01); *G06F 9/547* (2013.01); *G06F 21/53* (2013.01); *H04L 63/029* (2013.01); *G06F 2009/45587* (2013.01); *G06F 2009/45595* (2013.01)

(58) Field of Classification Search
CPC .......................... H04L 63/0272; H04L 63/029
See application file for complete search history.

(56) References Cited

U.S. PATENT DOCUMENTS

| | | | |
|---|---|---|---|
| 8,468,225 B2 | 6/2013 | Shlomo | |
| 8,925,064 B1 | 12/2014 | Bressler | |
| 9,232,013 B1 * | 1/2016 | Asnis | H04W 12/08 |
| 9,237,070 B2 | 1/2016 | Hill | |
| 9,264,403 B2 | 2/2016 | Flinta | |
| 9,338,181 B1 | 5/2016 | Burns | |
| 9,654,508 B2 * | 5/2017 | Barton | H04L 63/205 |
| 9,749,291 B2 * | 8/2017 | Fork | H04L 67/10 |
| 9,843,624 B1 * | 12/2017 | Taaghol | H04L 41/0803 |

(Continued)

OTHER PUBLICATIONS

Yisan Zhao, et al. "Application Attachment Based Firewall Management", U.S. Appl. No. 15/591,538, filed May 10, 2017.

(Continued)

*Primary Examiner* — Lynn D Feild
*Assistant Examiner* — Viral S Lakhia

(57) ABSTRACT

One or more VPN tunnels are established in a site-to-site configuration. A VPN transition subnet is defined and associated with each VPN tunnel. Once the VPN tunnel(s) and the LAN(s) have been configured, a per-application VPN policy can be specified for any applications that require site-to-site VPN access. Whenever a new application is launched, a container is created for executing the VM. The VPN management system reads the VPN policy to determine whether the application is permitted to access any VPN tunnels. If the application is permitted to access a VPN tunnel, a vNIC is generated on the VM for the container of the application and/or a new IP address on the vNIC is assigned to the container. The new IP address and/or the new vNIC are then added to the VPN transition subnet associated with the VPN tunnel to enable the application to access the VPN tunnel.

14 Claims, 5 Drawing Sheets

(56) References Cited

U.S. PATENT DOCUMENTS

| | | | | |
|---|---|---|---|---|
| 2014/0047535 | A1* | 2/2014 | Parla | H04L 67/1097 |
| | | | | 726/15 |
| 2014/0109174 | A1* | 4/2014 | Barton | H04W 12/08 |
| | | | | 726/1 |
| 2014/0109175 | A1* | 4/2014 | Barton | H04W 12/0027 |
| | | | | 726/1 |
| 2016/0156661 | A1* | 6/2016 | Nagaratnam | G06F 21/57 |
| | | | | 726/1 |
| 2017/0180249 | A1* | 6/2017 | Shen | H04L 45/586 |
| 2018/0302217 | A1* | 10/2018 | Hevia Angulo | H04L 63/0428 |
| 2019/0059117 | A1* | 2/2019 | Shu | H04W 76/19 |

OTHER PUBLICATIONS

Shengbo Teng, et al. "Application-Based Network Segmentation in a Virtualized Computing Environment", U.S. Appl. No. 15/272,440, filed Sep. 22, 2016.

Sam Zhao, et al. "Enforcing Per-Application VPM Policies for Applications Delivered in Virtualized Computing Environments", U.S. Appl. No. 15/802,378, filed Nov. 2, 2017.

\* cited by examiner

PER-APPLICATION VPN IN CONTAINER BASED ENVIRONMENTS

TECHNICAL FIELD

The present disclosure generally relates to networking for software applications in container environments and more particularly relates to enforcing policies that enable access to virtual private networks (VPNs) on a per-application and per-container basis.

BACKGROUND

A virtual private network (VPN) enables a computer to securely access resources located on a private network over a public network (e.g. Internet) connection. This is performed by establishing a VPN tunnel, which serves as an encrypted link between the external computer and the resources located behind the firewall on the private network. VPNs are often used to allow individual employees of a business or other organization to securely access the corporate intranet when the employees are located outside of the organization's physical premises. However, VPNs can also be implemented in a site-to-site configuration, where a VPN tunnel is established between gateway devices located in different physical locations (e.g. data centers) to create a single private network across both locations such that computers in each location can privately access the other location as though they were on the same local network by utilizing the gateway device located at their respective location.

It is frequently desirable to utilize site-to-site VPN in container-based environments, also sometimes referred to as operating system-level (OS-level) virtualization environments, such as those enabled by Docker and other frameworks. In a container environment, an abstraction layer is provided on top of the kernel of an operating system executing on a host computer. This abstraction layer enables the kernel to create multiple isolated user-space processes referred to herein as "containers". Typically, applications are executed within their own individual containers and the container is created for the application whenever the application is launched. However, it is also possible to run multiple applications within the same container. Applications running within a container can only see the container's contents and devices assigned to the container. Docker is just one example of software that provides containers, there are numerous other Linux and Windows based container technologies.

Applications running in containers sometimes need VPN access to access private resources hosted in data centers that are located in different geographic locations from the computer that is hosting the container. For example, the application may need to access a corporate intranet resource which is running on a server located behind a firewall in a different physical network from the computer hosting the application. In order to access such a resource, the application may require VPN access and it is therefore important to set up a VPN connection for the application. Moreover, it is usually good practice to enforce VPN access on a per-application basis, so that other applications are not permitted to access private resources that they should not have access to.

Currently, it is possible to enable per-application VPN access in container-based environments, however conventional approaches that provide a way to accomplish this are not a trivial task. For example, one possible approach is to modify the operating system configuration to achieve per-application routing. Under the Linux OS, this would entail creating a remote access VPN tunnel, creating an extra user for VPN traffic, creating an extra routing table with a default route via the VPN, and configuring the Netfilter iptables utility to use the new routing table for all traffic originating from the VPN-specific user ID. Such an approach involves a fairly advanced configuration sequence and this becomes even more complex when there are many applications each requiring a separate VPN. Another possible approach could be to set up VPN in each individual container in which the application runs so that the application can utilize the VPN tunnel of that particular container. However, this approach requires per-container manual configuration of VPN tunnels, which is also a non-trivial task. Moreover, this approach also requires the maintenance overhead of managing credentials, either using passwords or certificate credentials, which may impact automated application delivery scenarios. A more efficient and user-friendly approach to managing per-application VPN in container environments is needed.

DETAILED DESCRIPTION

Figure 1:
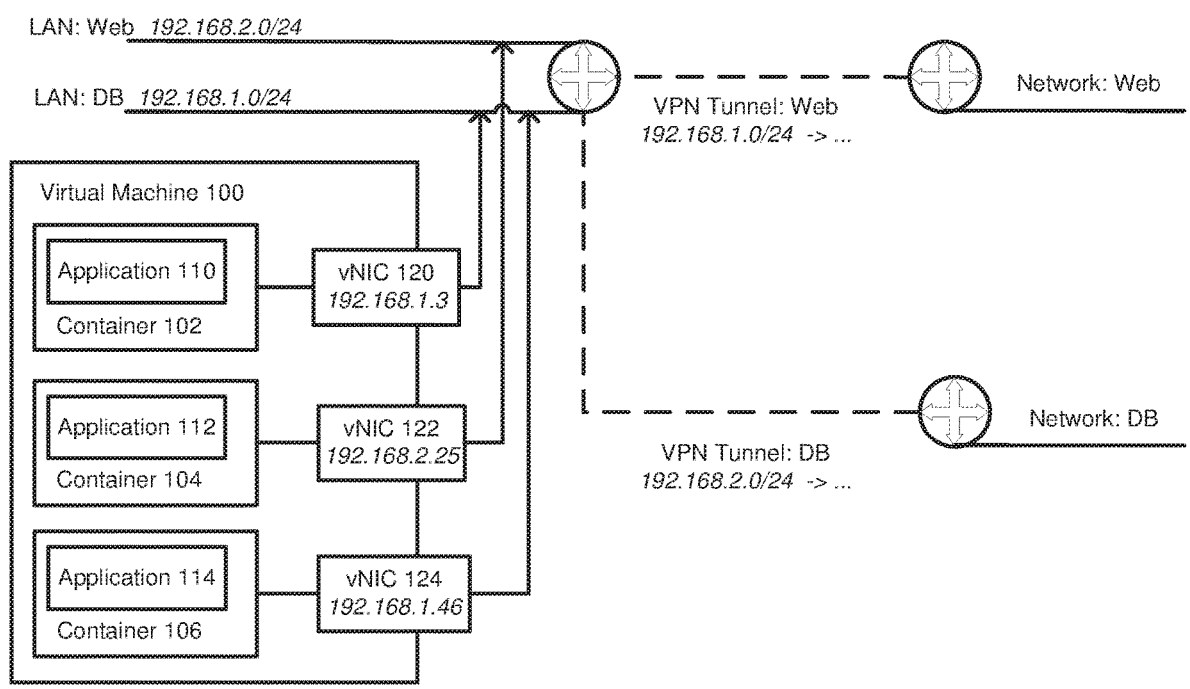
FIG. 1 illustrates an example of per-application VPN implemented using dedicated vNICs for each container, in accordance with various embodiments.

Systems and methods in accordance with various embodiments of the present disclosure overcome at least some of the above-mentioned shortcomings and deficiencies by enabling techniques for automatically enforcing VPN policies on a per-application basis in container-based environments. The embodiments described herein take advantage of network virtualization and virtual machine technologies to provide per-application VPN access when launching and deploying applications in containers. The integration of network virtualization software, as well as hypervisor and virtual machine-based technologies enable an automated and simplified way to manage and enforce per-application VPN access for applications running in containers when the containers are executed within a virtual machine.

In various embodiments, to enable per-application VPN, one or more VPN tunnels are first established in a site-to-site configuration, e.g. there is a VPN tunnel configured between two different geographic locations over the Internet. A local area network (LAN) is then defined and associated with each VPN tunnel. In one embodiment, the VPN tunnel and/or the LAN may be established by invoking the application programming interfaces (APIs) of a network virtualization software that enables conventional network provisioning and configuration tasks to be performed in the software layer. In an alternative embodiment, the VPN tunnel and the LAN may be manually configured, particularly in legacy environments in which the conventional network functions are embedded in physical data center devices such as switches, routers and the like.

Once the VPN tunnel(s) and the LAN(s) have been configured, an administrator may define a per-application VPN policy for any applications that require site-to-site VPN access. The VPN policy may specify, for example, that a particular application is permitted to transmit and receive data on a specific VPN tunnel. Once the administrator specifies the per-application VPN policy, the policy is stored to be used any time an application is launched.

In various embodiments, a VPN management system then monitors the deployment of applications in containers on virtual machines (VMs) and triggers the network configuration updates whenever an application is launched and executed within a container on a VM. In an embodiment, any time an application is launched, a corresponding container is created for the application on the VM. At this time, the VPN management system determines whether the application is permitted to access any VPN tunnels. This can be performed by reading the per-application VPN policy previously defined by the administrator. If the system determines that the application being launched is permitted to access the VPN tunnel, a virtual Network Interface Controller (vNIC) is generated on the VM for the container of the application and a new Internet Protocol (IP) address on the vNIC is assigned to the container. The VPN management system then invokes the APIs of the network virtualization software to update the VPN tunnel configuration to add the new IP address and/or the new vNIC to the LAN associated with the VPN tunnel. In this manner, the vNIC is connected to the LAN and the application running in the container is allowed to access the VPN tunnel.

In some embodiments, a separate vNIC is created for each individual container whenever an application is launched in the container on the VM. In these embodiments, the new vNIC is then connected to the LAN corresponding to the VPN tunnel in order to enable the application to access the VPN tunnel. In other embodiments, several containers may share the same vNIC created on the VM and in this case, each container is assigned a separate IP address on the shared vNIC. In these embodiments, the individual IP addresses are then added to the corresponding LAN based on the VPN policy to allow the applications in those containers to access the correct VPN tunnel associated with the LAN. In either scenario, because the application only sees the resources available to its specific container, the application is restricted to using only the VPN tunnel granted to that container and cannot access the VPN tunnels of other applications running in different containers.

FIG. 1 illustrates an example of per-application VPN implemented using dedicated vNICs for each container, in accordance with various embodiments. In this example, two VPN tunnels (a Web VPN tunnel 192.168.1.0/24 and a Database VPN Tunnel 192.168.2.0/24) have been configured between a local site hosting the applications and a remote site hosting resources that need to be accessed by the applications via VPN. As used herein, a VPN tunnel is a connection between two endpoints that is used to securely send traffic (i.e. data packets) over public networks such as the Internet. Typically, the packets transmitted over the VPN tunnel are encrypted by using a protocol such as IPSec in order to make the traffic private while the packets are in transmission over the public network. VPN tunnels may be established using a VPN gateway, which is a device (e.g. router, a server, etc.) that creates a VPN connection with a similar VPN gateway on the remote site to bridge the communication between devices on the local network and the remote site over the Internet. Setting up several site-to-site VPN tunnels, as illustrated in this example, might be useful in a deployment where some applications (e.g. MySQL, etc.) require VPN access to a database that is located at a remote site and other applications (e.g. Firefox, Chrome, other web browsers) require VPN access to a web server located in another remote site.

Once the VPN tunnels have been established, a separate local area network (LAN) is defined for each VPN tunnel. In one embodiment, the LAN defined for each VPN tunnel is a logical subnetwork (subnet) of the local network at the local site. Any devices that are connected to this subnet (e.g. by adding the IP address of the device to the subnet) gain access to the VPN tunnel associated with that subnet. As such, the LAN defined for a VPN tunnel is also referred to herein as a VPN transition subnet. In one embodiment, each VPN tunnel and LAN may be manually configured by the administrator prior to specifying the VPN policy for each application. In another embodiment, the VPN tunnels and LANs may be configured by a computer program, for example by invoking the network virtualization software APIs.

Once the VPN tunnels and LANs have been configured, an administrator may specify a per-application VPN tunnel policy using the VPN management system. The VPN management system can be implemented as an application, virtual appliance or any other computer program capable of handling the tasks of managing per-application VPN policies as described throughout the present disclosure. In one embodiment, VPN management system provides a graphical user interface (GUI) that the administrator can use to create a VPN tunnel policy record by specifying an application and the VPN tunnel which the application is permitted to access. An example of such VPN tunnel policy records is shown below:

| ID | Application | VPN |
|---|---|---|
| 1 | Firefox | VPN to Web network |
| 2 | Chrome | VPN to Web network |
| 3 | MySQLWorkBench | VPN to DB network |

Once the VPN policy has been specified by the administrator, applications can be deployed in containers on the VM by using an application and container management system and the VPN management system ensures that each application is granted access to the VPN tunnel specified by the VPN policy. Continuing with the example shown in FIG. 1, three applications (110, 112, 114) are deployed in their respective containers (102, 104, 106) on the virtual machine 100. Whenever an application is launched, a corresponding container is created for the application. The VPN management system is notified of the application launch and reads the VPN policy to determine whether the application is permitted to access any of the VPN tunnels. If the VPN policy allows the application to access a VPN tunnel, a new vNIC is created for the container and added to the LAN associated with the VPN tunnel that the application is permitted to access. As a result, the newly created vNIC receives an Internet Protocol (IP) address on the VPN transition subnet (LAN), either from the Dynamic Host Configuration Protocol (DHCP) server or otherwise assigned by the system. In FIG. 1, a separate dedicated vNIC (120, 122, 124) is created for each container (102, 104, 106) on VM 100 whenever the application is launched in the container. Specifically, when application 110 is launched in container 102, vNIC 120 is created on VM 100 for container 102 and the vNIC 120 is added to the VPN transition subnet 192.168.2.0/24 associated with the Database VPN tunnel. When application 112, is launched in container 104, vNIC 122 is created for container 104 and added to the LAN 192.168.1.0/24 associated with the Web VPN tunnel. Similarly, vNIC 124 is created for application 114 is added to the LAN 192.168.2.0/24 associated with the Database VPN tunnel. As a result of adding the vNICs on the respective LANs, each application (110, 112, 114) is able to access the corresponding VPN tunnel. Moreover, because each application (110, 112, 114) is only able to see the resources of their respective container, the applications cannot access VPN tunnels granted to other containers.

Figure 2:
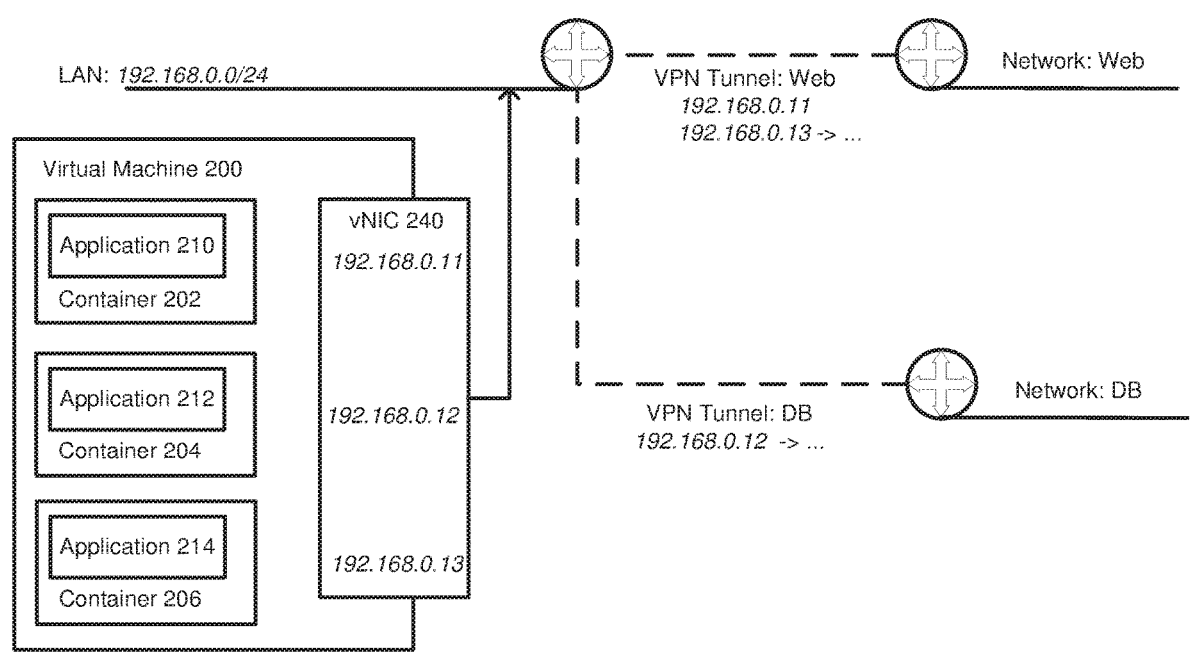
FIG. 2 illustrates an example of per-application VPN implemented using a shared vNIC between multiple containers, in accordance with various embodiments.

FIG. 2 illustrates an example of per-application VPN implemented using a shared vNIC between multiple containers, in accordance with various embodiments. In this example, similarly to the illustration in FIG. 1, three applications (210, 212, 214) are also deployed in their respective containers (202, 204, 206) on the virtual machine 200. However, in the example shown in FIG. 2, only a single shared vNIC 240 is created for all three containers (202, 204, 206). In one embodiment, the shared vNIC 240 may be created when the first application is launched in a container on VM 200. Subsequently, when any additional applications are launched, a new IP address is added to the shared vNIC 240 for each new container that is created.

Once the new IP address is created for the application, the new IP address is added to the LAN (VPN transition subnet) associated with the VPN tunnel that the application has been granted access to by the VPN policy. In one embodiment, the VPN management system invokes the APIs of the network virtualization software to modify the VPN configuration to add the new IP address to the LAN associated with the VPN tunnel. In this illustration, a single LAN (VPN transition subnet) is created for both VPN tunnels. The IP address 192.168.0.11 corresponding to container 202 and the IP address 192.168.0.13 of container 206 are added to the Web VPN tunnel. The IP address 192.168.0.12 corresponding to container 204 is added to the Database VPN tunnel. However, in other embodiments, a separate LAN (VPN transition subnet) may be created for each VPN tunnel, as illustrated in FIG. 1. The source IP addresses in VPN tunnel configuration can be a set. Thus, it can be either a specific IP address, or a plurality of IP addresses. The format depends on the actual routing software (e.g. NSX). For example, it can be configured as a Classless Inter-Domain Routing (CIDR) address (e.g. 192.168.1.0/24), or a single IP address (e.g. 192.168.1.3) or an IP address range (e.g. 192.168.1.3-192.168.1.44), as long as the routing software is configured to parse the format of specifying the address ranges.

Figure 3:
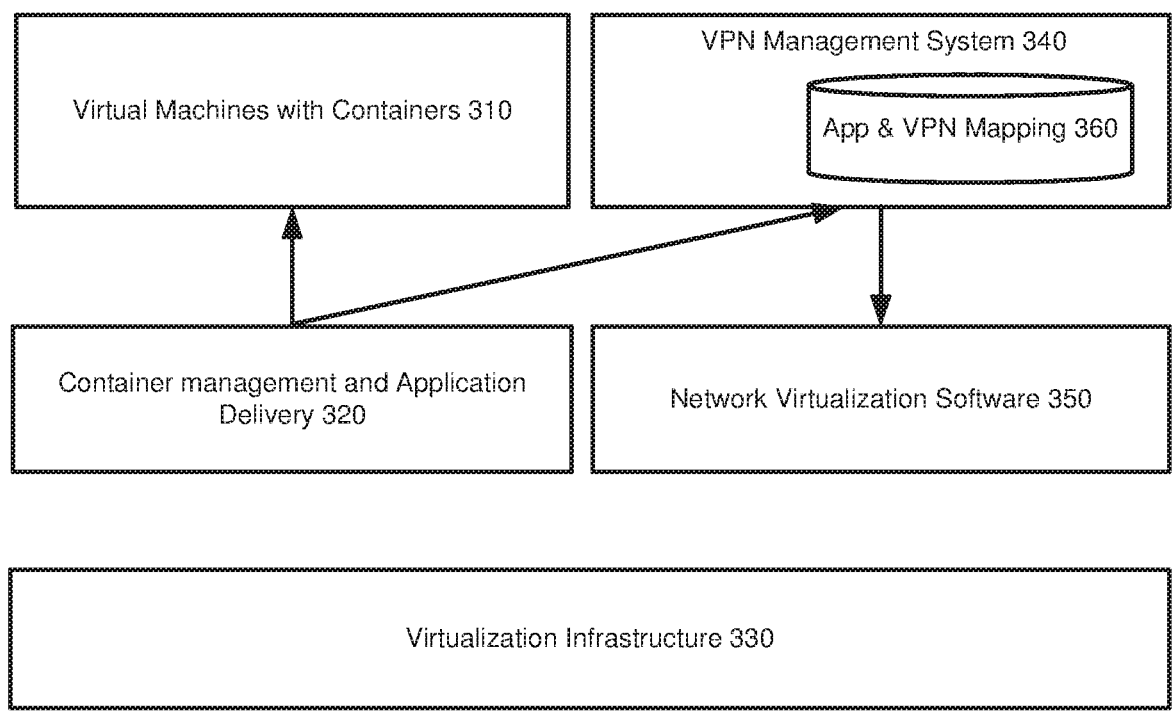
FIG. 3 illustrates an example of an architecture of components that may be used to implement per-application VPN, in accordance with various embodiments.

FIG. 3 illustrates an example of an architecture of components that may be used to implement per-application VPN, in accordance with various embodiments. As shown in the illustration, the virtualization infrastructure 330 includes a hypervisor capable of hosting virtual machines, as well as management software for performing various management tasks related to the VMs executed by the hypervisor, such as creating new vNICs on VMs. As used herein, a hypervisor, also sometimes referred to as a virtual machine monitor or a virtual machine manager (VMM), refers to the software that executes virtual machines on a physical computer. The physical computer on which the hypervisor is running is usually referred to as the "host" computer, while the individual virtual machines are referred to as "guests". Each virtual machine (VM) can be a full virtual representation of a real physical computer, including a virtual representation of the hard drive (referred to herein as a virtual disk or a virtual machine disk (VMDK)), and the VM can run a full instance of a complete operating system (referred to as a "guest" operating system). Generally, hypervisors can be classified into two categories—the type 1 "native" hypervisors (also sometimes referred to as "bare metal" hypervisors) and the type 2 "hosted" hypervisors. Native hypervisors run directly on the host computer's hardware and native hypervisors can themselves host multiple virtual machines that have individual guest operating systems. In contrast, hosted hypervisors run within a conventional host operating system (e.g, Windows, Linux, macOS, etc.) and thus hosted hypervisors represent a second layer of software above the hardware. In the illustrated embodiment, a native hypervisor is used, however some of the techniques described in this disclosure can be applied to hosted hypervisors as well. One example of a native hypervisor that can be implemented with the embodiments herein is VMware ESXi™ available as part of the VMware vSphere® product commercially provided by VMware, Inc. of Palo Alto, Calif. However, it will be evident to one of ordinary skill in the art that any other virtualization technologies such as Xen® and Microsoft Hyper-V® may be utilized in accordance with the various embodiments.

In various embodiments, the virtualization infrastructure 330 is used to perform various functions needed to execute a VM on a host computer, including creating a virtual network interface card (NIC). A virtual NIC is an abstract virtualized representation of a computer network interface that may correspond directly to a physical network interface controller. It is conventional that several virtual NICs are mapped to a single physical network interface controller, though this is not a limitation to all embodiments described herein. In various embodiments, the virtualization infrastructure 330 exposes one or more APIs that enables management programs to execute various functions on the VMs being executed by the hypervisor, including API calls to create or remove virtual NICs to/from a VM.

The container management and application delivery system 320 is a system that utilizes the virtual infrastructure 330 to deploy applications in containers on the VMs (310). As previously mentioned, a container is a user space process managed by the guest operating system kernel. Each container is isolated from the other containers in that they may be assigned private IP addresses, allow custom routes and iptables, can mount file systems, and the like. However, containers share the guest operating system's kernel, unlike virtual machines, which have their own individual guest operating systems. As such, container technology is sometimes referred to as operating system-level virtualization. When an application is launched, the container management and application delivery system 320 creates a container on the VM (310) for executing the application. At that time, the container management and application delivery system 320 notifies the VPN management system 340 of the new application, including the identifier of the target VM on which the application was launched and the IP address or vNIC of the container.

Once notified, the VPN management system 340 reads the VPN policy which specifies the application and VPN tunnel mapping 360 that was entered previously by the administrator. If the application being launched is permitted to access a particular VPN tunnel, the VPN management system invokes the APIs of the network virtualization software 350 to update the VPN network configuration according to the target VM and the IP address or vNIC. In one embodiment, the network virtualization software 350 adds the IP address of the container to the VPN transition subnet (LAN) associated with the VPN tunnel which the application is entitled to access. In another embodiment, where each container gets its own individual vNIC, the network virtualization software 350 adds the vNIC on the VPN transition subnet.

In various embodiments, the network virtualization software 350 is used to perform the attaching of the newly created vNICs or IP addresses of individual containers to the VPN transition subnet, as well as setting up the various logical networks and subnets that may be required for the embodiments described herein. Generally, network virtualization software 350 abstracts networking aspects from the underlying hardware and brings the conventional network provisioning and configuration tasks into the software layer. Network virtualization software 350 may also enable numerous functions, such as switching, routing, distributed firewalling, load balancing and the like. One example of the network virtualization software is VMware NSX™ commercially available from VMware, Inc. of Palo Alto, Calif. However, it will be evident that other network virtualization software tools can be utilized within the scope of the various embodiments.

In some embodiments, the administrator may subsequently block an application from using a VPN tunnel previously permitted to the application. Alternatively, the administrator may change the application to use a different VPN tunnel. The administrator can do this by first removing the VPN tunnel record corresponding to the application from the VPN policy by using the GUI of the VPN management system. The VPN management system then gets the list of all VMs and containers that are affected by this change in VPN policy.

The VPN management system may then invoke the network virtualization software APIs to disconnect each affected container from the corresponding VPN transition subnet. In some embodiments, the VPN management system may also remove the affected vNIC from the affected container(s). At this point, the application will no longer be access the VPN transition subnet. If the application has been granted access to any other VPN tunnel, the VPN management system may perform the process previously describe in order to enable the application with access to the new VPN tunnel.

Figure 4:
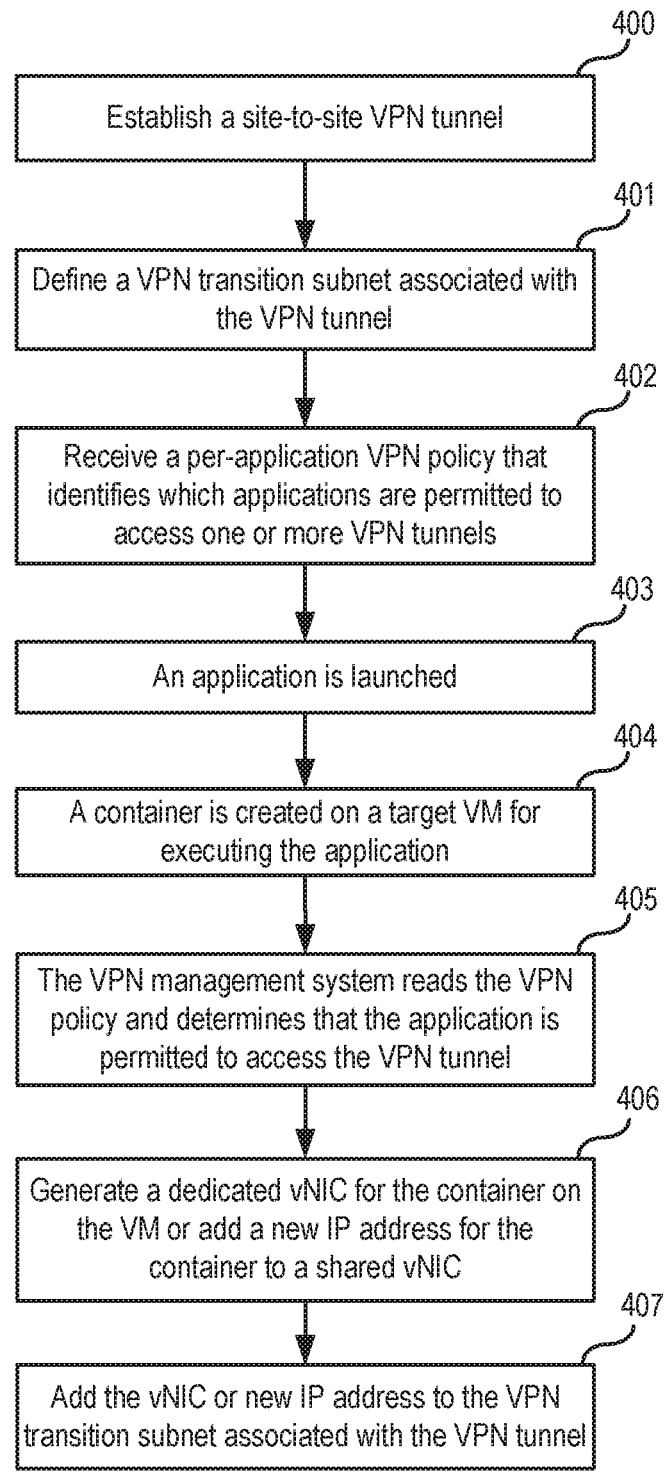
FIG. 4 illustrates an example of a process for enabling per-application VPN in containers executed on a VM, in accordance with various embodiments.

FIG. 4 illustrates an example of a process for enabling per-application VPN in containers executed on a VM, in accordance with various embodiments. As shown in operation 400, a VPN tunnel is first established between the local site hosting the applications and a remote site hosting resources that need to be accessed by the applications. In operation 401, a VPN transition subnet or LAN is defined and associated with the VPN tunnel. In operation 402, a per-application VPN policy is provided that specifies which applications are permitted to access one or more VPN tunnels. In one embodiment, the VPN policy may be entered by an administrator using a GUI of the VPN management system.

In operation 403, an application is launched and a container is created for executing the application on a target VM in operation 404. The VPN management system is notified of the new application instance and in operation 405, the VPN management system reads the VPN policy to determine whether the application is permitted to access any VPN tunnel. If the VPN management system determines that the application is permitted to access the VPN tunnel, a dedicated vNIC is created for the container or a new IP address of the container is added to a shared vNIC in operation 406, as previously described. In operation 407, the new vNIC or the new IP address of the container is added to the VPN transition subnet associated with the VPN tunnel that the application is permitted to access.

Figure 5:
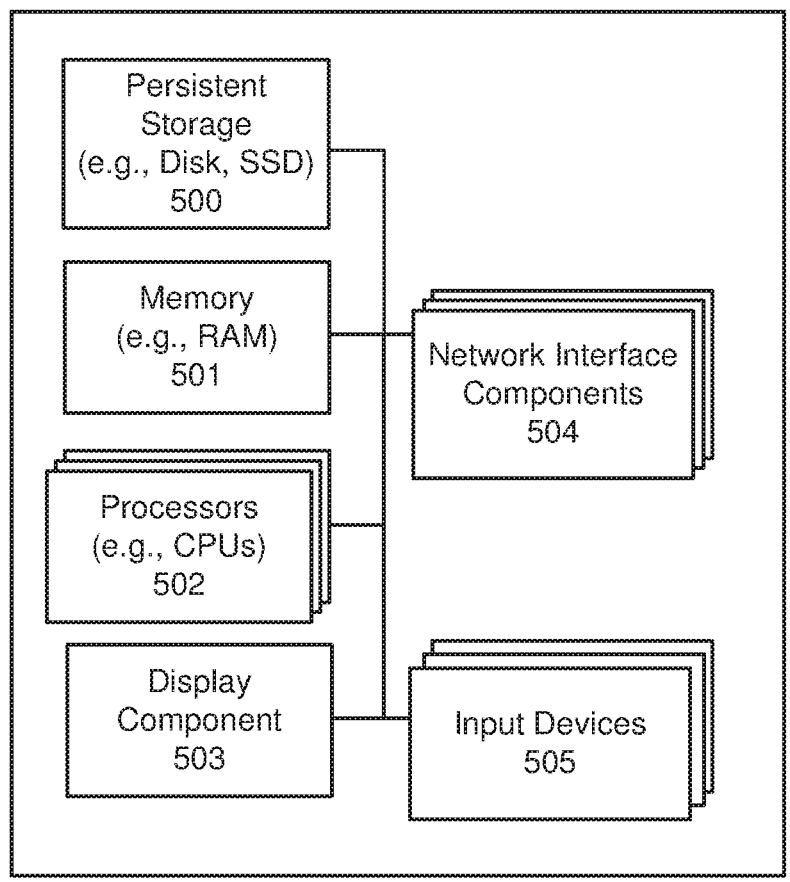
FIG. 5 illustrates an example of some general components of a computing device, in accordance with various embodiments.

FIG. 5 illustrates an example of some general components of a computing device, in accordance with various embodiments. In this particular example, the device includes one or more processors (e.g., central processing units (CPUs) 502 for executing instructions that can be stored in a storage medium component. The storage medium can include many types of memory, persistent data storage, or non-transitory computer-readable storage media. For example, the storage medium may take the form of random access memory (RAM) 501 storing program instructions for execution by the processor(s) 502, a persistent storage (e.g., disk or SSD) 500, a removable memory for sharing information with other devices and/or the like. The computing device typically can further comprise a display component 503, such as a monitor, a touch screen, liquid crystal display (LCD), or the like. In various embodiments, the computing device will include at least one input device 505 able to receive conventional input from a user. This conventional input can include, for example, a push button, touch pad, touch screen, wheel, joystick, keyboard, mouse, keypad, or any other such device or element whereby a user can input a command to the device. In some embodiments, the computing device can include a network interface component (NIC) 504 for communicating over various networks, such as a Wi-Fi, Bluetooth, RF, wired, or wireless communication systems. The device in many embodiments can communicate over a network, such as the Internet, and may be able to communicate with other devices connected to the same or other network.

Various embodiments described herein can be implemented in a wide variety of environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Many embodiments utilize at least one network that would be familiar to those skilled in the art for supporting communications using any of a variety of commercially-available protocols, such as TCP/IP, FTP, UDP or the like. The network can be, for example, a local area network, a wide-area network, a virtual private network, the Internet, an intranet, an extranet, a public switched telephone network, an infrared network, a wireless network, and any combination thereof.

The various environments in which the embodiments can be implemented may include a variety of data stores and other memory and storage media, as discussed above. These can reside in a variety of locations, such as on a storage medium local to one or more of the computers or remote from any or all of the computers across the network. In some embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for enabling per-application virtual private network (VPN) capability for containers, the method comprising:

establishing a VPN tunnel of a site-to-site configuration and associating a local area network (LAN) with the VPN tunnel, wherein the VPN tunnel and the LAN are established by invoking one or more application programming interfaces (APIs) of a network virtualization software;

receiving a per-application VPN policy that specifies which applications are permitted to access one or more VPN tunnels and storing the per-application VPN policy;

detecting a launch of an application on a virtual machine (VM) and creating a container to execute the application on the VM;

determining, based on the per-application VPN tunnel policy, that the application being launched is permitted to access the VPN tunnel;

generating a virtual Network Interface Controller (vNIC) for the container of the application on the VM and assigning a new Internet Protocol (IP) address on the vNIC to the container, wherein the vNIC is created for the container using a hypervisor hosting the VM; and connecting the vNIC to the LAN associated with the VPN tunnel based on the per-application VPN policy to enable the application running in the container to access the VPN tunnel.

2. The method of claim 1, wherein the vNIC is dedicated to the container executing the application.

3. The method of claim 1, wherein the vNIC is shared between the container executing the application and a second container executing one or more other applications.

4. The method of claim 1, further comprising:

determining that the per-application VPN tunnel policy has been modified to no longer permit the application to access the VPN tunnel;

disconnecting the IP address of the container from the LAN associated with the VPN tunnel to disable the application running in the container from accessing the VPN tunnel.

5. The method of claim 1, wherein the LAN is a subnet of a local network in the data center that is configured to link to a VPN tunnel in a remote location.

6. A computing device, comprising:

at least one processor; and memory including instructions that, when executed by the at least one processor, cause the computing device to:

establish a VPN tunnel of a site-to-site configuration and associate a local area network (LAN) with the VPN tunnel, wherein the VPN tunnel and the LAN are established by invoking one or more application programming interfaces (APIs) of a network virtualization software;

receive a per-application VPN policy that specifies which applications are permitted to access one or more VPN tunnels and store the per-application VPN policy;

detect a launch of an application on a virtual machine (VM) and create a container to execute the application on the VM;

determine, based on the per-application VPN tunnel policy, that the application being launched is permitted to access the VPN tunnel;

generate a virtual Network Interface Controller (vNIC) for the container of the application on the VM and assign a new Internet Protocol (IP) address on the vNIC to the container, wherein the vNIC is created for the container using a hypervisor hosting the VM; and connect the vNIC to the LAN associated with the VPN tunnel based on the per-application VPN policy to enable the application running in the container to access the VPN tunnel.

7. The computing device of claim 6, wherein the vNIC is dedicated to the container executing the application.

8. The computing device of claim 6, wherein the vNIC is shared between the container executing the application and a second container executing one or more other applications.

9. The computing device of claim 6, wherein the memory further includes instructions that, when executed by the at least one processor, cause the computing device to:
- determine that the per-application VPN tunnel policy has been modified to no longer permit the application to access the VPN tunnel;
- disconnect the IP address of the container from the LAN associated with the VPN tunnel to disable the application running in the container from accessing the VPN tunnel.

10. The computing device of claim 6, wherein the LAN is a subnet of a local network in the data center that is configured to link to a VPN tunnel in a remote location.

11. A non-transitory computer readable storage medium comprising one or more sequences of instructions, the instructions when executed by one or more processors causing the one or more processors to execute the operations of:
- establishing a VPN tunnel of a site-to-site configuration and associating a local area network (LAN) with the VPN tunnel, wherein the VPN tunnel and the LAN are established by invoking one or more application programming interfaces (APIs) of a network virtualization software;
- receiving a per-application VPN policy that specifies which applications are permitted to access one or more VPN tunnels and storing the per-application VPN policy;
- detecting a launch of an application on a virtual machine (VM) and creating a container to execute the application on the VM;
- determining, based on the per-application VPN tunnel policy, that the application being launched is permitted to access the VPN tunnel;
- generating a virtual Network Interface Controller (vNIC) for the container of the application on the VM and assigning a new Internet Protocol (IP) address on the vNIC to the container, wherein the vNIC is created for the container using a hypervisor hosting the VM; and
- connecting the vNIC to the LAN associated with the VPN tunnel based on the per-application VPN policy to enable the application running in the container to access the VPN tunnel.

12. The non-transitory computer readable storage medium of claim 11, wherein the vNIC is dedicated to the container executing the application.

13. The non-transitory computer readable storage medium of claim 11, wherein the vNIC is shared between the container executing the application and a second container executing one or more other applications.

14. The non-transitory computer readable storage medium of claim 11, wherein the LAN is a subnet of a local network in the data center that is configured to link to a VPN tunnel in a remote location.

* * * * *